United States Patent Office 3,395,105
Patented July 30, 1968

3,395,105
EPOXY SYSTEMS CONTAINING ENCAPSULATED
PRESSURE FRACTURABLE CURING AGENTS
Robert M. Washburn, Whittier, and Pieter A. H. Kremer,
Westminster, Calif., and Norman A. Beaucamp, Tulsa,
Okla., assignors to McDonnell Douglas Corporation,
Santa Monica, Calif., a corporation of Maryland
No Drawing. Filed Oct. 6, 1964, Ser. No. 401,989
6 Claims. (Cl. 260—6)

ABSTRACT OF THE DISCLOSURE

This invention is directed to epoxy resin compositions containing an encapsulated curing agent in the form of small fracturable capsules containing a material reactive with epoxy groups at substantially room temperature, preferably a water soluble aminophenol, encapsualted in a hardened protective colloid such as gelatin, such compositions being storable at room temperature, and when desired, by application of pressure, said capsules can be ruptured to release such reactive material for reaction with the epoxy resin at normal temperature, to affect rapid and efficient curing thereof.

---

This invention relates to shelf-stable epoxy systems, and is particularly concerned with epoxy resin formulations containing a curing agent, which formulations are stable at about room temperature but which can be made to set up at about room temperature as desired, on the application of pressure to the system, and to a process for effecting the curing of such systems.

Epoxy systems which cure at ambient temperatures are known, but up to the present their application and use have been limited because of the relatively short pot life of the systems. Thus, once the curing agent has been added to the epoxy formulation where such curing agent is one which will react with epoxy groups at room temperature, the formulation must be employed almost immediately to prevent premature setting up of the resin. However it is advantageous to employ epoxy formulations in which the curing agent has been previously incorporated, thus avoiding the necessity for adding the proper amount of curing agent to the formulation each time prior to use. Although epoxy systems containing curing agent have been developed which can be stored at room temperature as described in U.S. Patent 3,018,258, these formulations only become reactive on heating at elevated temperatures greater than about 60° C.

Fiber glass tape impregnated with epoxy resins are used widely for the preparation of filament wound structures, such as pressure vessels employed, for example, in the aerospace industry. Heretofore, epoxy systems used in filament winding required curing at elevated temperatures to insure stability under ambient conditions. As a result of the necessary elevated temperature cure, preimpregnated tapes containing epoxy systems including a curing agent reactable at elevated temperature cannot be satisfactorily and economically employed for the manufacture particularly of large or thick wall filament wound structures.

It is accordingly one object of the invention to provide an epoxy resin system having long pot lift, but which is curable as required at or near ambient temperature.

Another object is the provision of epoxy resin systems containing a curing agent which is ordinarily reactable with epoxy groups at room temperature, but which formulations can be stored at room temperature over an extended period and the system made reactive by release of the effective curing agent at the time of use by a simple procedure.

Yet another object is the provision of a tape or laminate which is preimpregnated with an epoxy resin system containing a curing agent, which system is stable under ambient conditions yet can be cured at ambient temperature at the time of application.

A still further object is the provision of a fiber glass tape impregnated with an epoxy resin formulation containing a curing agent normally reactable with epoxy groups at room temperature, such tape being stable on storage over extended periods, but which is effective for use on demand by a simple means for releasing the curing agent and rendering it effective for setting up or curing the resin, said tape being particularly designed for the preparation of filament wound structures which can be cured at or near room temperature.

An important object of the invention is the provision of procedure for rendering the curing agent in the above-noted epoxy systems effective by simple means to cure the epoxy resin at room temperature, at a desired time.

Other objects and advantages of the invention will be apparent hereinafter.

The above objects and advantages are achieved according to the invention by mixing a polyepoxide or an epoxy resin with a curing agent in the form of small fracturable or rupturable capsules containing a material reactive with epoxy groups at substantially room temperature, and encapsulated in a hardened protective colloid which is non-reactive with said epoxy resin at such temperature, and fracturing the capsules at substantially room temperature to cause the curing agent to react with said epoxy resin. According to a preferred embodiment for achieving rapid cure of the epoxy resin at room temperature aminophenol curing agents have been found particularly effective, in the form of small solid fracturable particles encapsulated with a hardened protective colloid insoluble in the epoxy resin and which is non-reactive with the epoxy resin at room temperature, a particularly desirable colloid of this type being gelatin. Such systems can be stored for extended periods of time, e.g., months, with substantially no reaction or setting up of the epoxy resin, yet are made reactive at room temperature at any desired period of use, by simple application of moderate pressure to the epoxy resin system or the base member, e.g., a tape, to which such system has been applied or with which it has been impregnated.

A particularly important application of the invention hereof is the provision of fiber glass tapes preimpregnated with a resin system of the type described above. Such tape can be stored for long periods of time at room temperature and when employed for producing filament wound structures, by the simple expedient of the application of modest pressure during the winding of such tapes to provide such structures, the curing agent will be released for reaction with the epoxy groups at normal temperature, hence avoiding the difficulty and uneconomic procedure of heating such wound structures at elevated temperature for effecting a cure, as heretofore required.

Thus, according to the invention, so long as the capsules of curing agent dispersed in the epoxy formulation remain intact, the epoxy resin system will have long shelf life, but when the capsules are ruptured the curing agent thus released mixes with the epoxy resin and curing or polymerization occurs rapidly at room temperature. The inert colloid encapsulating material remaining in the mixture has no adverse effect on the curing action or on the properties of the cured material. In addition to the advantages noted above, the instant invention permits mixing of the encapsulated curing agent with the epoxy resin substantially prior to actual use, thus avoiding the necessity of handling the resin and adding the curing agent thereto in the proper amount by operators just prior to use, and therefore a more uniform resin system is provided which is more economical and produces more uniform and improved results.

As previously pointed out, the material reactive with epoxy groups at room temperature and which is covered or encapsulated with the protective colloid, is most desirably an aminophenol type curing agent. Illustrative examples of such curing agents are as follows:

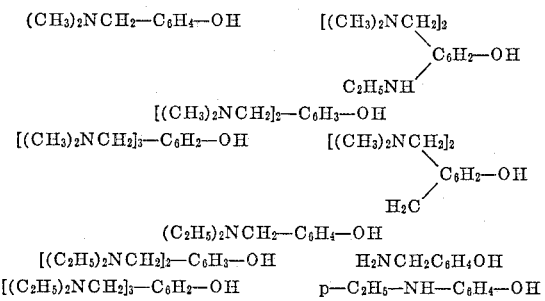

Representative curing agents among those listed above include tris (dimethylamino methyl) phenol, marketed as DMP 30, p-ethylaminophenol and aminomethyl phenol. It will be noted that the amino group or groups contained in the above noted curing agents can be primary amino or substituted amino groups, and that such amino groups can be directly connected to the aromatic ring of such phenols or indirectly connected thereto, as illustrated by the above-noted amino-, aminoalkyl-, e.g., aminomethyl-, and alkylaminoalkyl-, e.g., ethylaminomethyl-, groups. Hence the term "aminophenol" or "aminophenol" curing agents employed in the specification and claims is intended to denote phenols containing an amino or amino groups and is inclusive of all of the above described and above listed curing agents.

However, other curing agents or materials which are reactable with epoxy groups at room temperature or slightly above room temperature, e.g., at about 20° to about 25° C., can be employed in the invention. Thus, for example, aliphatic polyamines, such as aliphatic or alkylene diamines, can be employed. Specific examples of such aliphatic polyamines includes ethylenediamine, propylenediamine, diethylenetriamine, triethylenetetramine, and the like. The aliphatic polyamines, however, are not preferred since these compounds have a tendency to leak through the colloid encapsulation, and the high vapor pressure of some of such aliphatic polyamines renders them less desirable for use in the invention system. It will be noted that such aliphatic polyamines are listed as suitable materials reactive with epoxy groups at elevated temperature according to the above U.S. Patent 3,018,258.

The above-noted materials which are reacted with epoxy groups at room temperature, are rendered non-reactive with epoxy resins by coating or encapsulating small particles of such materials with a protective colloid which is suitably hardened so that the resulting capsules can be ruptured readily to release the effective curing agent by the application of moderate pressure. The protective colloid employed can be any material which is insoluble in epoxy systems and is inert with epoxy groups at normal room temperature and which is capable of being hardened to form a protective colloid which is rupturable as above noted. Examples of encapsulating materials useful according to the invention include gelatin, methylcellulose, starch, dextrine, vinyl polymers such as polyvinyl alcohol, and combinations such as a combination of gelatin and gum arabic, and the like. As previously noted, gelatin has been found particularly suitable and is preferred.

A hardening agent for the protective colloid used for encapsulation is necessary to seal the surface of the small particles of material reactive with the epoxy groups, and to prevent leakage of such material through the encapsulation and into contact with the epoxy resin. Hardeners which can be employed for this purpose include formaldehyde, and formaldehyde generators such as paraform, trioxane or hexamethylenetriamine. Other suitable hardeners include furfural and other suitable aldehydes, such formaldehyde and other aldehydes being employed usually in the form of aqueous solutions. Also, solutions of weak acids, e.g., acetic or formic acid, can be utilized. However such acid hardeners are not as effective as the aldehydes, and formaldehyde or formaldehyde generating hardeners are preferred for purposes of the invention.

Small particles of the reactive material or curing catalyst are employed for encapsulation. If the particles of such curing agent encapsulated are too large, an undesirable local concentration of curing agent in the epoxy system occurs. On the other hand, if the particle size of the curing catalyst is too small, the amount of curing agent present in the epoxy system becomes deficient. Hence it is preferred to employ a particle size of capsules containing material reactive with epoxy groups, in a range such as to provide even distribution of the curing agent and its presence in sufficient amount on rupture of the encapsulated particles. Thus, for example, particle size of the capsules containing reactive material, generally is in the range of from about 1 to about 25 microns, although in some instances larger or smaller particle size of the capsules can be employed.

It is preferred to employ as small an amount of protective colloid as possible but at least sufficient to cover the particles of reactive material or catalyst sufficiently to prevent leakage of such material into the epoxy resin matrix. Generally the ratio of the amount of curing catalyst or reactive material to be encapsulated, e.g., aminophenol, to the amount of protective colloid employed, e.g., gelatin, can range from about 0.5 part to about 5 parts colloid per 25 parts of curing catalyst, by weight.

The procedure for encapsulating the above described reactive materials or curing catalysts can be varied. Since the catalyst materials, e.g., the aminophenols, preferably employed according to the invention, are water soluble, an aqueous solution of the reactive material or curing agent in suitable concentration can be formed and such solution mixed with a sol of a suitable colloid, e.g., gelatin, formed by incorporating such gelatin in water in suitable concentration. The resulting aqueous mixture of curing agent and colloid are stirred, preferably at reduced temperature in the presence of a salt such as potassium chloride. The presence of such salt results in a two layer system causing the gel to coalesce around the catalyst particles to provide efficient and thorough encapsulation of such particles. In place of potassium chloride any other suitable soluble salt can be employed, e.g., sodium chloride. However, salts which hydrolyze to form a strong acid and a weak base, such as aluminum chloride, should not be used, but salts which hydrolyze to form a strong base and a weak acid, such as sodium acetate, can be employed since the aqueous solution of gel and curing catalyst is somewhat basic. In accordance with the instant invention such salt, e.g., potassium chloride, functions in a dual capacity to produce separate layers of the gel and of the reactive material for proper coating thereof and also to cause such coated or encapsulated material to precipitate out.

During further cooling of such mixture, the hardening agent, preferably an aqueous solution of formaldehyde, is added to produce the desired hardening of the encapsulated material. After a period of time, the small solid particles of encapsulated material, or capsules can be removed from the solution and suitably washed, for example, with water and with a solvent such as acetone, and such capsules then dried in air. The resulting encapsulated particles can then be incorporated into an epoxy system or resin.

The amount of curing agent or catalyst which can be employed for incorporation into an epoxy system or resin can be varied. In general it has been found that the amount of capsules containing curing agent which can be employed in the epoxy resin can range from about 0.2 to about 15%, preferably from 1 to about 10% by weight of the mixture.

The epoxy resins or polyepoxides which are cured according to the invention principles include those organic compounds containing a plurality of epoxy groups, i.e.,

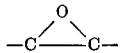

groups. These compounds may be saturated or unsaturated, aliphatic, cycloaliphatic, aromatic or heterocyclic and may be substituted if desired with substitutents, such as chlorine atoms, hydroxyl groups, ether radicals, and the like. They may also be monomeric or polymeric.

Other examples include epoxidized esters of polyethylenically unsaturated monocarboxylic acids, such as epoxidized linseed, soybean, tung, walnut and dehydrated castor oil, the epoxidized esters of unsaturated monohydric alcohols and polycarboxylic acids, such as, for example, di(2,3-epoxybutyl)adipate, di(2,3-epoxybutyl)oxalate, di(2,3-epoxyheptyl)succinate, di(2,3-epoxybutyl)maleate, the epoxidized esters of unsaturated alcohols and unsaturated carboxylic acids, such as 2,3-epoxybutyl 3,4-epoxypentanoate, epoxidized derivatives of polyethylenically unsaturated polycarboxylic acids such as, for example, dibutyl 7,8,11,12-diepoxyoctadecanedioate, the epoxidized polyethylenically unsaturated hydrocarbons, such as epoxidized 2,2-bis(2-cyclohexenyl)propane, epoxidized vinyl cyclohexene and epoxidized dimer of cyclopentadiene, butadiene diepoxide, and the epoxidized polymers and copolymers of diolefins, such as butadiene, e.g., butadieneacrylonitrile copolymers (hycar rubbers), butadienestyrene copolymers, and the like. Preferred epoxies comprise the glycidyl esters, such as the glycidyl esters of the dicarboxylic acids, e.g., diglycidyl phthalate and diglycidyl adipate, and particularly the glycidyl ethers such as the glycidyl ethers of the phenols, e.g., the diglycidyl ether of bisphenol-A, the triglycidyl derivative of p-aminophenol, and the glycidyl ether of polyphenolics.

The various polyepoxides or epoxy resins noted above are generally in the B-stage or are only partially polymerized when the encapsulated curing agent of the invention is incorporated therein. On release of the curing agent by rupture of the capsules through application of pressure, the released curing agent reacts with the epoxy groups at about room temperature to promote rapid polymerization and final cure of the initially partially polymerized resin.

The particles of encapsulated curing agent can be incorporated into the polyepoxide or epoxy resin either with or without the use of a diluent or solvent. The polyepoxide can be a solid or a liquid material but in the preferred epoxy formulations the epoxy resin is in liquid form and as previously noted, the capsules containing the curing agent are insoluble therein. Where the epoxy resin contains a solvent, the solvent employed should be such that the capsules of curing agent are also insoluble therein. Thus, for example, various solvents such as ketones, e.g., acetone, methylethyl ketone and the like, ether alcohols such as methyl, ethyl or butyl ether of ethylene glycol or diethylene glycol, and chlorinated hydrocarbons, such as chloroform can be employed. High boiling solvents can also be used which remain in the cured resin and function as plasticizers. Examples of these materials are diethyl phthalate, dioctyl phthalate, 2-ethylhexyl adipate, and the like.

The epoxy systems or resins having the encapsulated curing agent dispersed therein according to the invention are particularly valuable in the production of laminates, especially in the form of large structures, which are curable at room temperature, thus avoiding the necessity of heating such structures to obtain the cure. Hence, for example, laminates of various materials including both non-fibrous synthetic resinous materials, e.g., sheets of the resins listed below, and also fibrous textile materials, particularly sheets of glass cloth, matting, asbestos, cotton duck and the like, can be bonded together employing the epoxy formulation of the invention in a partially cured form, and such laminates containing said epoxy formulation having the unreacted encapsulated curing agent particles dispersed therein, can be stored at room temperature for extended periods. A final cure can be effected for such laminates by subjecting the laminate, either just subsequent to formation or at a period following storage thereof, to modest pressure at normal temperature to release the curing agent and cause reaction thereof with the epoxy groups of the epoxy bonding agent.

A particularly important application of the epoxy system of the invention is as an adhesive and as a coating and impregnating composition. Thus, the epoxy system hereof can be used as a coating on non-fibrous tapes or base films formed of resins or plastics such as polyethylene, polypropylene, Mylar (polyethylene terephthalate), Teflon (polytetrafluoroethylene), vinyls such as polyvinyl chloride, polystyrene, polycarbonates, and acetates such as cellulose acetate or cellulose acetatebutyrate. The epoxy system of the invention is also useful for the impregnation of tapes of fibrous materials, especially for the impregnation of fiber glass tapes for use in the production of pressure windings or pressure vessels. Thus, for example, an impregnated fiber glass cloth tape according to the invention can be prepared by dipping the fiber glass cloth into a liquid polyepoxide or liquid epoxy resin formulation containing the capsules of curing catalyst which are ruptured by pressure and reactive at room temperature in accordance with the invention. The epoxy system with which the fiber glass cloth is impregnated is a partially polymerized epoxy, that is, a B-stage epoxy, and following impregnation of the fiber glass cloth, the tape is dried to produce a tape having a somewhat tacky surface. The tape is lightly wound on a reel, preferably with a paper backing between adjacent surfaces of the reeled tape. During reeling of the tape only a light winding tension is applied to the epoxy impregnated tape so that there is insufficient pressure to cause rupture of the capsules of curing agent.

The reels of tape impregnated with the epoxy system of the invention can then be stored at room temperature for prolonged periods without any setting up or curing of the epoxy occurring. When the tape is used for producing a winding for a pressure vessel, the backing paper between adjacent tape surfaces is removed as the tape is unwound from the reel and is wound on a mandrel for the production of such pressure vessel or winding. Alternatively the tape can be impregnated with the epoxy composition of the invention prior to winding the tape.

As the tape is wound on the mandrel for producing the pressure vessel or winding, a pressure roller can be applied against the tape with sufficient pressure to cause rupture of the capsules of curing agent in the epoxy system, causing the released curing agent to react rapidly with the epoxy resin to promote polymerization and curing thereof at room temperature. Alternatively the capsules can be ruptured to release the curing agent by applying tension to the tape during the winding process. Thus, for the production of pressure vessels or windings of substantial thickness and size, use of a tape impregnated with an epoxy system according to the invention, and which is readily cured by application of pressure and at room temperature, eliminates the impractical and uneconomical necessity for heating the winding after formation thereof at elevated temperatures to effect the cure, as heretofore required using conventional techniques.

As previously noted, according to another application of the epoxy system of the invention, the solid encapsulated particles can be incorporated in solid epoxy resins and intimately mixed to form a molding powder. Such molding powders can be cured by the application of pressure substantially in the absence of any applied heat to produce cured moldings.

As heretofore pointed out, the ruptured outer coating or colloid material present in the matrix following rupture of the capsules and during curing of the epoxy resin by the released curing agent, has substantially no adverse effect on the action of the curing agent and simply remains in the matrix as a filler material.

The following are examples of practice of the invention:

Example 1

Twenty-three grams of gum arabic are dissolved in 150 ml. of water saturated with KCl at a temperature of 60° C., and then 400 ml. of DMP 30 curing agent are added; an emulsion forms which is maintained at 60° C. Then a sol is made of 25 grams of porkskin gelatin, 10 ml. 0.1 N NaOH and 15 ml. water, saturated with KCl and heated to 60° C. The emulsion and sol are mixed together and cooled under continuous stirring to obtain coacervation. The mixture is then cooled to 40° F. and 30 ml. formaldehyde (37% solution in water) are added to harden the capsules which are formed. After several hours, the capsules are removed from the solution and thoroughly washed, first with water and then with acetone.

After being exposed to the air and dried on porous filter paper for about 0.5 hr., some of these capsules are mixed with the epoxy resin marketed as ERLA 2710, understood to be a highly purified diglycidyl ether of bisphenol-A, employing about 10% by weight of the capsules in the mixture. The mixture is divided into two portions. In one of them, the capsules are ruptured by application of pressure; in the other, the mixture is left untouched and remains at room temperature. The first batch cures in a short time at room temperature, such that the resin becomes dimensionally stable in about 1 minute. The actual curing rate depends on various factors such as particle size of curing agent, ratio of curing agent to epoxy, and the specific type of curing agent and epoxy employed. However, essentially no curing of the second batch takes place over a period of 10 days following this test.

The remainder of the capsules are left on the filter paper for several hours to dry. A shrinkage of the capsules occurs during this period. The same test as noted above with the epoxy resin is then repeated and substantially the same results are obtained, but it requires more pressure to fracture the capsules after the above-noted longer period of drying.

Example 2

Capsules of curing agent according to the invention are fabricated by mixing under continuous stirring at 140° F. a sol of 7 grams of porkskin gelatin in 50 ml. of water saturated with KCl, and an emulsion of 7 grams of gum arabic in 40 ml. of water saturated with KCl and containing 100 ml. of DMP 30 curing agent. During cooling to 40° F., 10 ml. of furfural and 10 ml. of formaldehyde (37% aqueous solution) are added, and then dilute sulfuric acid is added until the mixture is acidic. The capsules formed are thoroughly washed with water and then with acetone. After drying on filter paper for a few hours, the capsules are added to epoxy resin ERLA 2710 in a proportion of about 5% of the capsules by weight of the mixture, and the mixture is divided into two portions. In one portion, the capsules are fractured at room temperature; in the other, they are left untouched and remain at room temperature. Curing takes place rapidly at room temperature in the batch with the fractured capsules; the other batch remains substantially unchanged and does not cure over a prolonged period of time.

Example 3

Capsules containing curing agent according to the invention can be formed by mixing under continuous stirring at 140° F. a sol of 7 g. of porkskin gelatin in 50 ml. of water saturated with potassium chloride, and an emulsion of 7 g. of gum arabic in 40 ml. of water saturated with potassium chloride and 95 g. of p-ethylaminophenol. During cooling to 40° F., 10 ml. of furfural and 10 ml. of formaldehyde are added, and then dilute sulfuric acid is added until the mixture is acidic. The capsules thus formed are thoroughly washed with water and then with acetone. After drying the capsules are mixed with butadiene diepoxide in an amount of about 2% of the capsules by weight of the mixture. Pressure rupture of the capsules at room temperature causes rapid curing of the epoxy material at such temperature.

Example 4

In a manner similar to that described in Example 3, capsules containing other aminophenol curing agents are prepared, mixed with epoxies as noted in the table below, and caused to react with such epoxies at room temperature by pressure rupture of the capsules at such temperature.

TABLE

| Aminophenol | Epoxy |
|---|---|
| $(CH_3)_2NCH_2-C_6H_4-OH$ | Diglycidyl ether of bisphenol-A. |
| $[(CH_3)_2NCH_2]_2-C_6H_3-OH$ | Do. |
| $(C_2H_5)_2NCH_2-C_6H_4-OH$ | Butadiene diepoxide. |
| $[(C_2H_5)_2NCH_2]_2-C_6H_3-OH$ | Do. |
| $H_2NCH_2C_6H_4-OH$ | Do. |
| $[(C_2H_5)_2NCH_2]_3-C_6H_2-OH$ | Triglycidyl ether derivative of p-aminophenol having the formula $(\overset{O}{\overset{}{CH_2-CH_2}})_2N-\langle\rangle-OCH_2\overset{O}{\overset{}{CH-CH_2}}$ |
| $[(CH_3)_2NCH_2]_2\diagdown C_6H_2-OH \atop H_2N\diagup$ | Triglycidyl ether derivative of p-aminophenol having the formula $(\overset{O}{\overset{}{CH_2-CH_2}})_2N-\langle\rangle-OCH_2\overset{O}{\overset{}{CH-CH_2}}$ |

Example 5

Some of the capsules produced in Example 1 are incorporated in epoxy resin ERLA 2710, and the mixture of epoxy resin and capsules placed between two glass plates. On squeezing the plates, the capsules rupture, causing cure of the resin at room temperature and the resulting adhesion of the two plates.

Example 6

An impregnated fiber glass cloth tape is prepared by dipping the cloth into ERLA 2710 epoxy resin containing encapsulated DMP 30 curing agent particles produced as in Example 1, said resin mixture containing about 5% of the capsules by weight. The resin impregnated tape is placed on an aluminum plate and is caused to cure by pressure rupture of the capsules at room temperature, resulting in adhesion of the tape to the aluminum at such temperature.

Example 7

An impregnated fiber glass cloth tape prepared as described in Example 6 is wound on a mandrel to form a pressure winding at room temperature. During winding, sufficient tension is placed on the tape to rupture the capsules of curing agent and cause curing of the epoxy resin, resulting in a pressure winding which is cured at room temperature.

Example 8

A Teflon film or tape is first surface treated, as by etching, to permit proper adherence of an epoxy resin thereto, and the thus treated surface is then coated with ERLA 2710 epoxy resin containing encapsulated DMP 30 curing agent particles produced as in Example 1, said resin mixture containing about 5% of the capsules by weight. The resin coated tape is placed on an object with the coated side in contact therewith, and by application of pressure to the tape at room temperature, the capsules of curing agent are caused to rupture, resulting in room temperature curing of the epoxy and strong adhesion of the tape to such object.

From the foregoing, it is seen that the invention provides epoxy systems containing an encapsulated curing agent, such systems being stable and unreactive over an extended period of time. Such systems can be stored at room temperature prior to use, and when it is desired to cure such systems, a simple application of pressure ruptures the capsules and releases the curing agent from its protective sheath, and the released curing agent reacts with the epoxy material at normal temperature to effect rapid and efficient curing. Such systems are particularly designed for use in producing preimpregnated fiber glass tapes having particular utility for the provision of pressure windings which can be cured easily at ordinary room temperature.

It will be understood that various modifications and adaptations of the invention can be made without departing from the spirit of the invention, and the invention accordingly is not to be taken as limited except by the scope of the appended claims.

We claim:

1. A process for curing an epoxy resin which comprises mixing an epoxy resin with a curing agent in the form of small fracturable capsules containing a material reactive with epoxy groups at substantially room temperature, said material being selected from the group consisting of water soluble aminophenols and aliphatic polyamines, and encapsulated in a hardened protective colloid which is non-reactive with said epoxy resin at said temperature, and fracturing said capsules at substantially room temperature to cause said curing agent to react with said epoxy resin.

2. A process for curing an epoxy resin which comprises mixing an epoxy resin with a curing agent in the form of small fracturable gelatin capsules containing water soluble aminophenol reactive with epoxy groups at substantially room temperature, and fracturing said capsules at substantially room temperature to cause said curing agent to react with said epoxy resin.

3. A process for curing n epoxy resin which comprises mixing a liquid partially polymerized epoxy resin of diglycidyl ether and bisphenol A with a curing agent comprising small solid fracturable particles of tris(dimethylaminomethyl)phenol encapsulated in gelatin, said tris(dimethylaminomethyl)phenol being reactive with epoxy groups at substantially room temperature, said particles being present in an amount of about 1 to about 10% by weight of said mixture, and applying pressure to said encapsulated particles at about room temperature, said pressure being sufficient to rupture said encapsulated particles and to release said aminophenol into contact with said epoxy resin and cause said aminophenol to react with said epoxy resin.

4. An epoxy resin composition which is stable at substantially room temperature, which comprises a mixture of an epoxy resin and small fracturable capsules containing water soluble aminophenol reactive with epoxy groups at substantially room temperature and encapsulated in a hardened protective colloid which is non-reactive with said epoxy groups at room temperature, said capsules being present in an amount of about 0.2% to about 15% by weight of said mixture.

5. An epoxy resin composition which is stable at substantially room temperature, which comprises a mixture of a liquid partially polymerized epoxy resin in the form of a diglycidyl ether of bisphenol-A, and small fracturable capsules containing tris(dimethylaminomethyl)phenol encapsulated in a hardened gelatin coating, said capsules being present in an amount of about 0.2% to about 15% by weight of said mixture.

6. A fiber glass tape impregnated with an epoxy resin having dispersed therein small fracturable capsules containing water soluble aminophenol reactive with epoxy groups at substantially room temperature and encapsulated in a hardened protective colloid which is non-reactive with said epoxy groups at room temperature, said tape being sensitive to pressure to fracture said capsules and cause reaction of said aminophenol with said epoxy resin to cure same.

References Cited

UNITED STATES PATENTS

| | | | |
|---|---|---|---|
| 2,907,682 | 10/1959 | Eichel | 117—122 |
| 3,018,258 | 1/1962 | Meier et al. | 260—47 |
| 3,069,370 | 12/1962 | Jensen et al. | 260—17.4 |
| 3,100,160 | 8/1963 | Korpman | 117—122 |
| 3,277,050 | 10/1966 | Pettigrew | 260—47 |

OTHER REFERENCES

Thiokol, Bulletin PE-12, Epoxy Hardeners, pp. 1-2, January 1962.

WILLIAM H. SHORT, *Primary Examiner.*

E. M. WOODBERRY, *Assistant Examiner.*